(12) United States Patent
Revanna et al.

(10) Patent No.: US 9,588,872 B2
(45) Date of Patent: Mar. 7, 2017

(54) DISCOVERY OF CODE PATHS

(71) Applicant: VMware, Inc., Palo Alto, CA (US)

(72) Inventors: Naveen Revanna, Sunnyvale, CA (US); Chitrank Seshadri, Saratoga, CA (US); Mang Kwan Ma, Dublin, CA (US)

(73) Assignee: VMware, Inc., Palo Alto, CA (US)

( * ) Notice: Subject to any disclaimer, the term of this patent is extended or adjusted under 35 U.S.C. 154(b) by 16 days.

(21) Appl. No.: 14/628,116

(22) Filed: Feb. 20, 2015

(65) Prior Publication Data

US 2016/0246701 A1    Aug. 25, 2016

(51) Int. Cl.
G06F 9/44 (2006.01)
G06F 15/16 (2006.01)
G06F 11/36 (2006.01)

(52) U.S. Cl.
CPC ...... G06F 11/3636 (2013.01); G06F 11/3688 (2013.01)

(58) Field of Classification Search
CPC .................. G06F 11/3636; G06F 11/3688
USPC .......... 717/128, 129, 133; 709/217; 712/227
See application file for complete search history.

(56) References Cited

U.S. PATENT DOCUMENTS

| | | | | |
|---|---|---|---|---|
| 9,021,448 B1 * | 4/2015 | Gagliardi | ............... | G06F 8/70 717/128 |
| 2003/0149743 A1 * | 8/2003 | Baluja | ............... | H04L 67/04 709/217 |
| 2005/0071820 A1 * | 3/2005 | Srinivas | ............... | G06F 11/366 717/129 |
| 2007/0226473 A1 * | 9/2007 | Kapustin | ............. | G06F 11/3648 712/227 |
| 2008/0059843 A1 * | 3/2008 | Sato | .................... | G06F 11/3636 714/45 |
| 2009/0106329 A1 * | 4/2009 | Masuda | ............ | G06F 17/30377 |
| 2010/0250467 A1 * | 9/2010 | Weinstein | .............. | G06Q 40/06 705/36 R |
| 2011/0023019 A1 * | 1/2011 | Aniszczyk | .............. | G06F 9/445 717/128 |
| 2011/0154300 A1 * | 6/2011 | Rao | ..................... | G06F 11/3624 717/133 |

(Continued)

OTHER PUBLICATIONS

*Breakpoint.* Wikipedia, the free encyclopedia. Last modified on Aug. 20, 2014. Retrieved on Sep. 4, 2014. Retrieved from the Internet: URL<http://en.wikipedia.org/wiki/Breakpoint>. 3 pages.

(Continued)

*Primary Examiner* — Li B Zhen
*Assistant Examiner* — Mohammad Kabir

(57) ABSTRACT

Systems and techniques are described for tracking software code paths. A described technique includes receiving a first log of stack traces that includes a respective stack trace for each of a plurality of calls to access any of a plurality of data objects created during a first execution of an application, generating, for each of the stack traces in the first log, a script for a respective probe that identifies the data object accessed by the call corresponding to the stack trace, a respective instruction called to access the data object, and whether the access is a read or a write access for the data object, generating, for at least one of the probes, a second log that identifies the data object for the respective probe and the data stored in the data object, and generating a representation of the execution of the application using the second log.

21 Claims, 8 Drawing Sheets

(56) References Cited

U.S. PATENT DOCUMENTS

| | | | |
|---|---|---|---|
| 2014/0032975 A1* | 1/2014 | Chandran | G06F 11/3636 714/47.1 |
| 2014/0237454 A1* | 8/2014 | Delporte | G06F 11/3636 717/128 |
| 2015/0130485 A1* | 5/2015 | Whetsel | G01R 31/2884 324/750.02 |
| 2015/0227406 A1* | 8/2015 | Jan | G06F 11/079 714/37 |
| 2015/0347220 A1* | 12/2015 | Hermany | G06F 11/0787 714/48 |

OTHER PUBLICATIONS

Carbone, M. et al. *VProbes: Deep Observability Into the ESXi Hypervisor*. VMware Technical Journal, vol. 3, No. 1. Published Jun. 2014. pp. 27-35.

Copperman, M. *Poor Man's Watchpoints*. UC Santa Cruz—Jack Baskin School of Engineering. Published Apr. 26, 1994. 14 pages.

Ma, M. et al. *The Dynamic Data Tracker: A Software Package to Support Data Tracing*. VMware Technical Journal, vol. 3, No. 1. Published Jun. 2014. pp. 80-84.

Wahbe, R. et al. *Practical Data Breakpoints: Design and Implementation*. Proceedings of the ACM SIGPLAN'93 Symposium on Programming Language Design and Implementation. Albuquerque, NM. Published Jun. 1993. 12 pages.

Zhao, Q. et al. *How to do a million watchpoints: Efficient Debugging Using Dynamic Instrumentation*. The International Conference on Compiler Construction (CC2008). Published Apr. 2008. 15 pages.

* cited by examiner

```
#include "ddtapi.emt"

VMK:OFFSET:module_foo.funcFoo:0xabcdef00000 {
    long backTraceID;
    long accessType;
    long objAddress;
    long objOffset;
    long accessSize;
    long dataValue;

backTraceID = 11;
    accesstype = READ;
    accessSize = 8;
    objAddress = getgpr(REG_RAX);
    objOffset = 0xf00d;
    dataValue = ddt_getValue(objAddress, objOffset);

/* Add your tracing code here */ ddt_log_access(backTraceID,
            accessType,
            accessSize,
            objAddress,
            objOffset,
            dataValue,
            0,
            "")   }

VMK:OFFSET:module_bar.funcBar:0xabcdeff00000 {
    bag stk;
    long backTraceID;
    long accessType;
    long accessSize;
    long objAddress;
    long objOffset;
    long oldValue;
    long newValue ddt_getstacktrace(stk);
    backTraceID = 0;
    accesstype  = WRITE_WITH_REG;
    accessSize  = 8;
    objAddress  = getgpr(REG_RBX);
    objOffset   = 0xfeed;
    newValue    = getgpr(REG_RAX);
    oldValue    = ddt_getValue(objAddress, objOffset);

/* Add your tracing code here */ ddt_log_access(backTraceID,
            accessType,
            accessSize,
            objAddress,
            objOffset,
            oldValue,
            newValue,
            stk);   }
```

502 — first block
504 — second block

| Field Names | Size (in bytes) | Type | Comments |
|---|---|---|---|
| BacktracID | 8 | Unsigned long | Record ID in BacktraceIDMap file |
| AccessPoint | 8 | Unsigned long | Address of instruction where access takes place |
| AccessType | 2 | Unsigned long | 1 = read; 2 = write constant; 3 = write with register |
| AccessSize | 2 | Unsigned long | 1, 2, 4, 8 |
| ObjectRegister | 4 | Unsigned long | Register that holds the data object address, can be one of the following values: RAX = 1; RDX = 2; RCX = 3; RBX = 4; RSI = 5; RDI = 6; RBP = 7; RSP = 8; R8 = 9; R9 = 10; R10 = 11; R11 = 12; R12 = 13; R13 = 14; R14 = 15; R15 = 16; |
| ObjectOffset | 8 | Unsigned long | Byte offset into the object |
| NewValue | 8 | Unsigned long | Integer constant If AccessType is equal to 2; If AccessType is equal to 3, then one of the following values is used. RAX = 1; RDX = 2; RCX = 3; RBX = 4; RSI = 5; RDI = 6; RBP = 7; RSP = 8; R8 = 9; R9 = 10; R10 = 11; R11 = 12; R12 = 13; R13 = 14; R14 = 15; R15 = 16; |

| Field Names | Size (in bytes) | Type | Comments |
|---|---|---|---|
| BacktracID | 8 | Unsigned long | An integer that identifies this record |
| TraceDepth | 8 | Unsigned long | An integer indicates the number of call levels in the trace |
| ReturnAddress | 8 | Unsigned long | The return address of the current call and repeat this field 'TraceDepth' that many times |

FIG. 7

| Field Names | Size (in bytes) | Type | Comments |
|---|---|---|---|
| BacktracID | 8 | Unsigned long | ID identify a record in BacktraceIDMap |
| AccessType | 4 | Unsigned long | 1 = read; 2 = write constant; 3 = write register |
| AccessSize | 4 | Unsigned long | 1, 2, 4, 8 |
| ObjectAddress | 8 | Unsigned long | Address of the object |
| ObjectOffset | 8 | Unsigned long | Offset into the object |
| OldValue | 8 | Unsigned long | The previous value at the offset of the object |
| NewValue | 8 | Unsigned long | New value to be written to the offset of the object |
| TraceDepth | 8 | Unsigned long | This field and the next field exist if BacktraceID is 0; The depth of the stacktrace that follows |
| ReturnAddress | 8 | Unsigned long | Return address of the current call and repeat this field 'TraceDepth' that many times. |

FIG. 8

DISCOVERY OF CODE PATHS

BACKGROUND

This document relates to tracking software code paths.

A software code path may include a list of the various methods called and data objects created and accessed during execution of an application. For instance, a particular application may have different software code paths each time the particular application is executed, based on input from a user or application variables.

SUMMARY

In general, one aspect of the subject matter described in this document can be embodied in a technique that includes receiving a first log of stack traces that includes a respective stack trace for each of a plurality of calls to access any of a plurality of data objects created during a first execution of an application, generating, for each of the stack traces in the first log, a script for a respective probe that identifies the data object accessed by the call corresponding to the stack trace, a respective instruction called to access the data object, and whether the access is a read or a write access for the data object, generating, for at least one of the probes, a second log that identifies the data object for the respective probe and the data stored in the data object, and generating a representation of the execution of the application using the second log.

In general, one aspect of the subject matter described in this document can be embodied in a technique that includes receiving, for each of a plurality of data objects, a call to create the respective data object during an execution of an application, receiving, for each of the plurality of data objects, a respective return address that identifies a corresponding memory location for the data object, assigning, for each of the plurality of data objects, a corresponding watchpoint address, which causes a page fault when accessed, to the corresponding data object, receiving, for at least some of the plurality of data objects, a call to execute a respective instruction that includes the corresponding watchpoint address to access the corresponding data object, and recording, in response to receiving the call to execute the instruction that includes the corresponding watchpoint address to access the corresponding data object, a stack trace of a call stack for the application in a first log.

These and other aspects can optionally include one or more of the following features. The script for the respective probe that identifies the data object accessed by the call corresponding to the stack trace may include a script for the respective probe that identifies the data object accessed by the call corresponding to the stack trace with an address for the data object. Generating, for the at least one of the probes, the second log that identifies the data object for the respective probe and the data stored in the data object may include for each probe in a subset of the probes generated from a stack trace in the first log that identifies a read access to a respective data object, storing a current data value from the respective data object in the second log when the respective data object is accessed, for each probe in another subset of the probes generated from a stack trace in the first log that identifies a write access to a respective data object, storing a new data value and a current data value from the respective data object in the second log when the respective data object is accessed, or both. Each of the probes may identify the respective stack trace. The method may include receiving, for at least one of the probes, input from a user defining logic for the corresponding probe, wherein the logic provides troubleshooting analysis to a user, determining, during a second execution of the application, that the logic for a particular probe should be executed, and presenting, using the logic for the particular probe, information about a respective particular data object identified in the script for the particular probe in response to determining that the logic for the particular probe should be executed.

In some implementations, generating the representation of the execution of the application using the second log may include analyzing a performance of the execution of the application using the second log, and providing a visual presentation of the performance on a user interface. Analyzing the performance of the execution of the application using the second log may include analyzing a central processing unit's access to a cache during the execution of the application.

In some implementations, generating the representation of the execution of the application using the second log comprises generating instructions for a presentation of a visual representation of the execution of the application. The method may include providing the instructions for the presentation of the visual representation of the execution of the application to a display. Providing the instructions for the presentation of the visual representation of the execution of the application to the display may include providing, for at least one of the probes, instructions for a presentation of at least some of the data stored in the corresponding data object to the display. Providing the instructions for the presentation of at least some of the data stored in the corresponding data object to the display may include providing instructions for a presentation of data identifying how the data stored in the corresponding data object is changed or accessed during the execution of the application. Providing the instructions for the presentation of the visual representation of the execution of the application to the display may include providing instructions for a presentation of a visual representation of the execution of the application using data identified in at least one of the probes. Providing the instructions for the presentation of the visual representation of the execution of the application may include presenting a history of the execution of the application using the second log, and highlighting a representation of a particular probe from the probes when data from the corresponding data object is accessed during the execution of the application.

In some implementations, the method may include receiving, for each of the plurality of data objects, a call to create the respective data object during the first execution of the application, receiving, for each of the plurality of data objects in response to receiving the call to execute the corresponding constructor method, a respective return address that identifies a corresponding memory location for the data object, assigning, for each of the plurality of data objects, a corresponding watchpoint address, which causes a page fault when accessed, to the corresponding data object, receiving, for at least some of the plurality of data objects, a call to execute a respective instruction that includes the corresponding watchpoint address to access the corresponding data object, and recording, in response to receiving the call to execute the instruction that includes the corresponding watchpoint address to access the corresponding data object, a stack trace of a call stack for the application in the first log.

In some implementations, assigning the corresponding watchpoint address to corresponding the data object that will cause a page fault when accessed may include mapping, for each of the plurality of data objects, the corresponding watchpoint address to the corresponding return address in a table. The method may include replacing, for the at least some of the plurality of data objects in response to receiving the call to execute the instruction that includes the corresponding watchpoint address to access the corresponding data object, the corresponding watchpoint address in the respective instruction with the corresponding return address, and executing, for the at least some of the plurality of data objects in response to replacing the corresponding watchpoint address in the respective instruction with the corresponding return address, the respective instruction with the corresponding return address.

In some implementations, receiving the call to execute the respective instruction that includes the corresponding watchpoint address to access the corresponding data object may include determining, for the at least some of the plurality of data objects, that accessing the watchpoint address will cause a page fault, and receiving, for the at least some of the plurality of data objects, the call to execute the respective instruction that includes the corresponding watchpoint address to access the corresponding data object in response to determining that accessing the watchpoint address will cause a page fault. Assigning the corresponding watchpoint address, which will cause a page fault when accessed, to the corresponding data object may include assigning, for each of the plurality of data objects in response to receiving the return address that identifies the corresponding memory location for the corresponding data object, a unique corresponding watchpoint address, which will cause a page fault when accessed, to the corresponding data object. The method may include receiving, for at least some of the plurality of the data objects, a call to execute a corresponding destructor method during the execution of the application, removing, for the at least some of the plurality of the data objects, the assignment of the corresponding watchpoint address to the corresponding data object, and removing, for the at least some of the plurality of the data objects, a reference to the corresponding data object from memory.

Particular embodiments of the subject matter described in this document can be implemented so as to realize one or more of the following advantages. In some implementations, an application analysis system may track any quantity of data objects, e.g., tens, hundreds, or thousands of data objects, created during the execution of the particular application. In some implementations, an application analysis system may monitor data objects irrespective of the size of the data objects, e.g., data objects that may span multiple physical pages in memory. In some implementations, an application analysis system may provide a user with information to help debug or optimize execution of an application, or both.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

FIG. 5 shows an example of a script that includes code for two dynamic probes.

FIG. 6 shows an example format of a stack trace record.

FIG. 7 shows an example format of a BacktraceIDMap record.

FIG. 8 shows an example format of an object change record.

Like reference numbers and designations in the various drawings indicate like elements.

DETAILED DESCRIPTION

Figure 1:
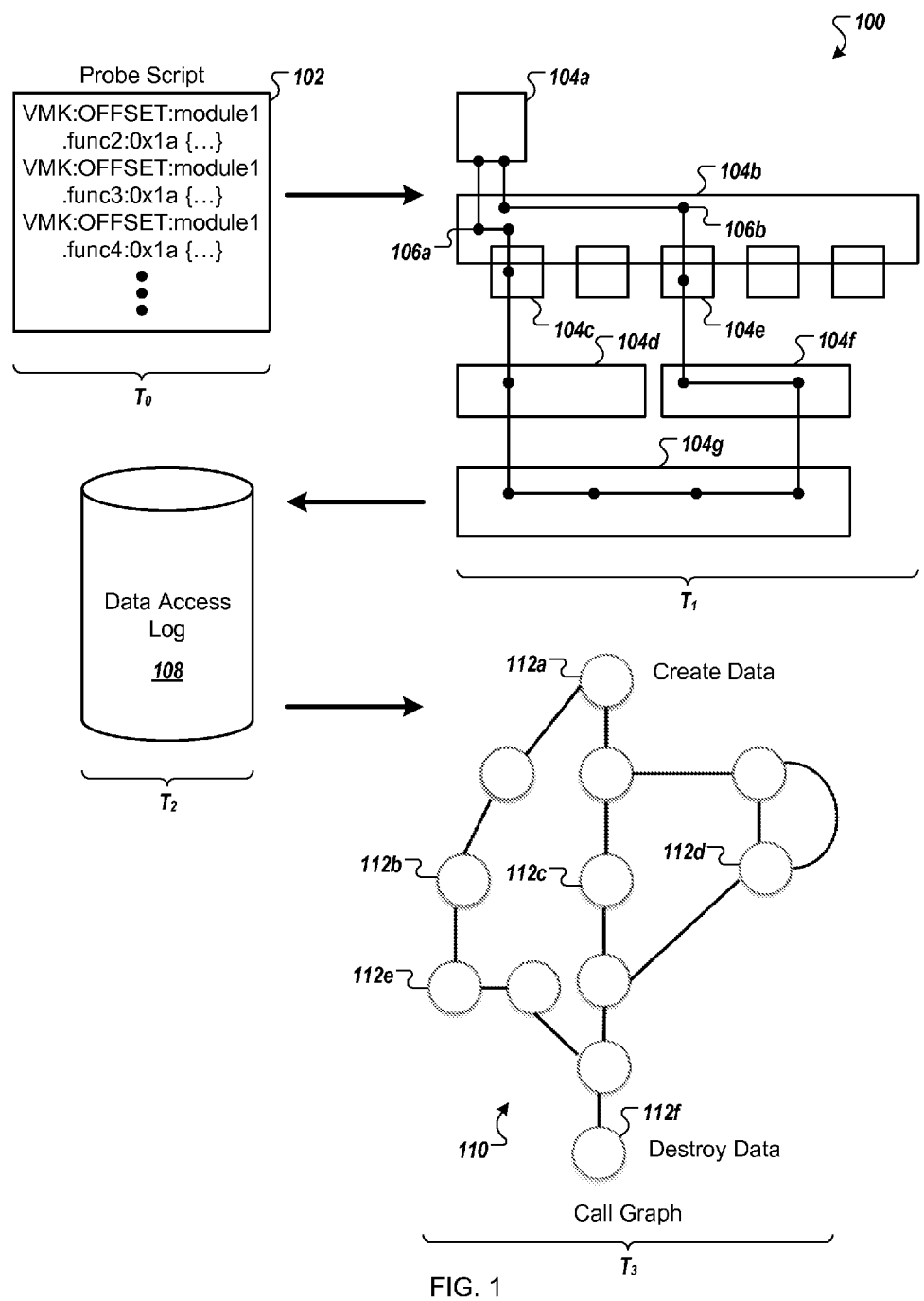
FIG. 1 shows an example of an environment for generating a call graph that represents a code path traversed during execution of an application.

This specification generally describes a framework to track and record stack traces during execution of applications when there is a read or a write access to a data object. A stack trace, or a backtrace, may be a list of active stack frames for an application at a particular point in time. For example, the framework may create a stack trace when the application sends a read request for a particular data object.

The framework may record these stack traces during the execution of a particular application, e.g., when there is a bug in the application but a solution to the bug has not been determined, and use the stack traces to re-create a call graph, e.g., a representation of which data objects were accessed when and in what order during the execution of the particular application. A user may then view the call graph, or other data associated with analysis of the stack traces, for example, to determine a solution to the bug or to optimize the application.

When the framework identifies a call to create a data object during the execution of the particular application, the framework may create a software watchpoint to monitor access to that particular data object. One example of a software watchpoint may be a virtual address that has no actual corresponding physical memory location. When a method in the application tries to access the data object using the watchpoint, the method causes a page fault.

The framework includes a page fault handler that receives a notification of the page fault and records a stack trace of the application's stack. The framework may then execute the instruction that caused the page fault by replacing the virtual address of the watchpoint with the actual address for the corresponding data object. After execution of the instruction, the framework returns control to the next instruction.

Once an operation scenario that reproduces an issue in a particular application is completed, the framework stores all of the stack traces, e.g., to a file or using another appropriate storage mechanism. For example, each of the stored stack traces represents the point in the code path of the application when a particular data object was accessed, e.g., the data for the current instance of the application that is stored in memory. In some examples, only the stack traces for data objects of interest, e.g., as specified by an administrator, are stored or are used during analysis of the application.

The framework may use the stored stack traces to generate a script that defines attributes for each access point. The framework may use the script or stored stack traces to generate a call graph that provides a graphical view of the code path involved in the operation scenario of the particular application, e.g., which data objects were accessed when and in what order and what data was stored in those data objects.

In some examples, the script may be used to reproduce the same operation scenario in which a bug occurred. Use of the script may allow a user to view the execution of the application one step at a time, e.g., when each step represents a read or write request to a particular data object. In this way, the user may have a visual aid to browse the execution history of the particular application to look for suspicious access to the data objects that may lead to the software bug and take appropriate action, e.g., to correct the code of the particular application.

In some implementations, the framework may use probes to dynamically intercept calls to constructor methods, e.g., that create data objects in memory, and destructor methods, e.g., that remove access to data objects from memory, during the execution of the particular application. For example, when a data object is created, a probe, programmed to identify the particular method or type of method called, intercepts the return of the data object's address inside the constructor method. The framework then allocates a watchpoint address, e.g., a virtual address, for the data object and creates a mapping of the watchpoint address to the data object's address. In some examples, a module in the kernel of the operating system stores the mapping. The probe returns the watchpoint address as the address of the data object for use when the particular application accesses the data object. When a method in the application uses the watchpoint address, a page fault occurs, and the framework stores information associated with the corresponding data object and then provides the data object's actual address to the method. When a data object is destroyed, another probe, programmed to identify calls to destructor methods, intercepts the entry of the destructor method of the data object, replaces the watchpoint address with the data object's actual physical address. The destructor then completes its execution and probe removes the mapping between the watchpoint and the data object.

FIG. 1 shows an example of an environment 100 for generating a call graph that represents a code path traversed during execution of an application. The environment 100 includes a probe script 102, e.g., as part of an application analysis system, that defines particular methods for which the application analysis system monitors and actions performed in response to detection of a call to the methods during the execution of the application, e.g., the creation of an access record. For instance, at time $T_0$, the application analysis system may receive input defining the probe script 102 for a particular application from a device operated by a user.

The application analysis system executes the particular application during time $T_1$, and for each class 104a-g in the application, the application analysis system uses probes created using the probe script 102 to determine whether any of the particular methods are called during the execution of the particular application. For example, a probe defined by "module1.func2 . . . " may be for a constructor method for a particular type of data object and another probe defined by "module1.func3 . . . " may be a for a destructor method for the particular type of data object. During time $T_1$, the application analysis system may determine that the constructor method is called, represented by data access point 106a, and create a watchpoint for the particular data object. The application analysis system determines that the data object is accessed using the watchpoint and creates, during time $T_2$, an access record in a data access log 108 that indicates data, e.g., a call stack, for the data access point 106a. Later, during the execution of the particular application, the application analysis system may determine that the destructor method is called, represented by data access point 106b, and remove the watchpoint.

In some implementations, the application analysis system may execute the application multiple times, e.g., twice. For instance, during time $T_2$, the application analysis system may generate the data access log 108 when watchpoints, created during calls to predetermined constructor methods for particular data objects, are accessed during a first execution of the application. For example, when each of the particular data objects is accessed as identified using the watchpoints, the application analysis system may create a record, which includes the call stack, in the data access log 108. The watchpoints may be removed during execution of predetermined destructor methods for the particular data objects during the first execution. The application analysis system may receive identification of the predetermined constructor and destructor methods from a user, e.g., as input in the probe script 102.

The application analysis system may then use the data access log 108 and another probe script, during time $T_{2.5}$, to create probes and execute the application a second time. Each of the probes is associated with a specific data access point, e.g., the data access points 106a-g, for one of the particular data objects and cause additional information about the specific data access point to be stored in another data access log. In some implementations, the data access log 108 and the other data access log are the same log. In other implementations, the data access log 108 and the other data access log are different logs.

During time $T_3$, the application analysis system, e.g., a data access virtualizer included in a dynamic data tracker, may use the data access log 108, and optionally the other data access log, to generate a call graph 110 that shows a traversal path of access to the particular data object, a particular type of data object, a subset of data objects, or all data objects accessed during the execution of the particular application, e.g., as determined by the application analysis system using input from a user. For instance, each node 112a-f in the call graph 110 represents a particular instance when a data object was accessed, such as creation of the data object at node 112a and destruction of the data object at node 112f, and corresponds to a record in the data access log 108.

In some examples, each of the nodes may correspond to one of the data access points 106a-b accessed during the execution of the particular application during time $T_1$. For example, the node 112a corresponds to data access point 106a when the data object was created and the node 112f corresponds to data access point 106b when the data object was destroyed.

The application analysis system may present the call graph 110 to a user to provide the user with a visualization of the execution of the particular application. The call graph 110 may assist the user in optimizing execution of the particular application or finding an issue, e.g., bug, in the particular application and determining a solution to the issue.

Figure 2:
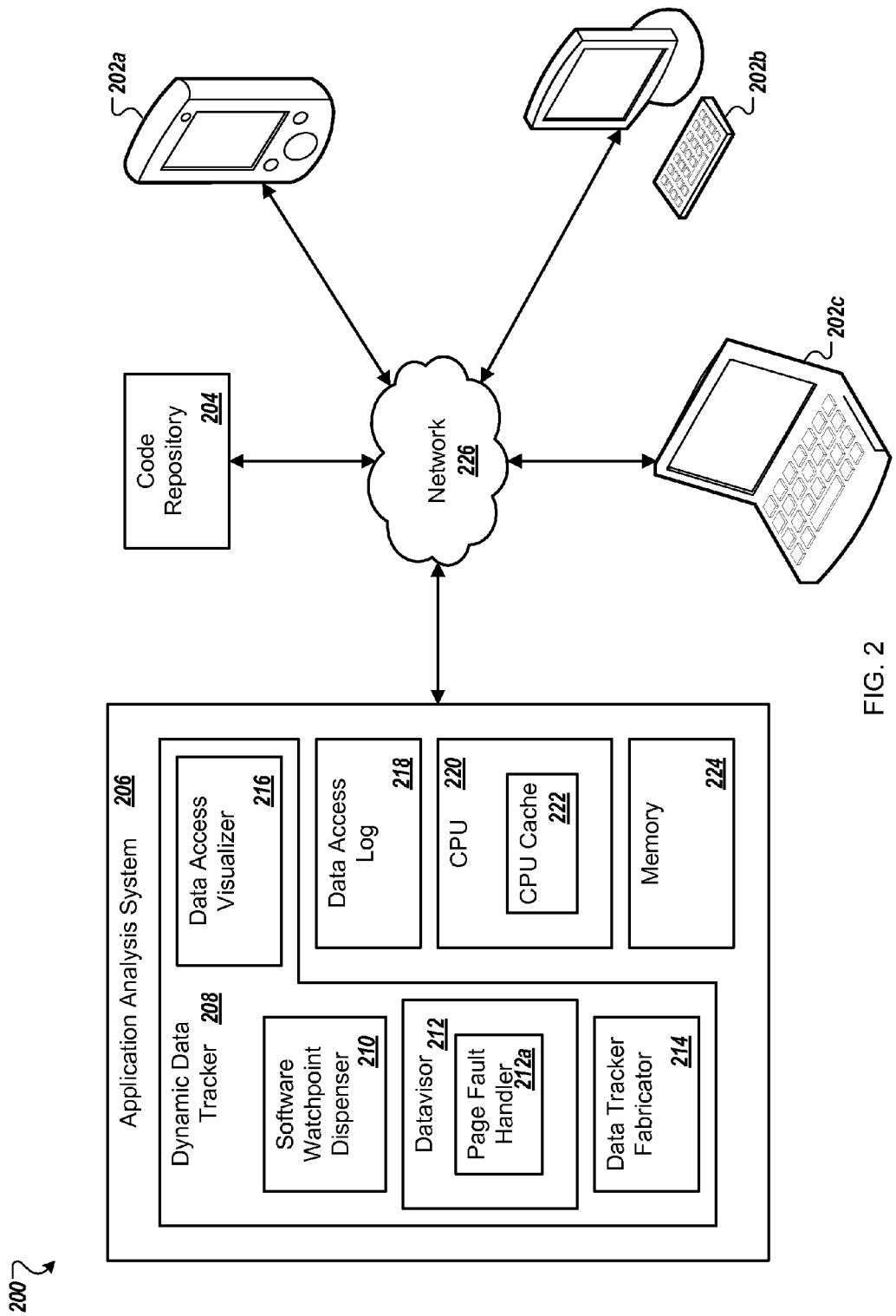
FIG. 2 shows an example architecture of an environment for analyzing the execution of an application.

FIG. 2 shows an example architecture of an environment 200 for analyzing the execution of an application. Users may operate user devices 202a-c to develop or update an application stored in a code repository 204. During or after development, the users may use an application analysis system 206 to analyze the application to identify potential issues with the application, such as a bug or ways the execution of the application could be optimized.

The application analysis system 206 includes a dynamic data tracker 208 that traces code paths and collects application execution information related to the code paths. For instance, a software watchpoint dispenser 210 may include a template script that allows a user to define how the dynamic data tracker 208 should create software watchpoints for a particular application or a group of applications, e.g., when there are similarities between all of the applications in the group. In some examples, the software watchpoint dispenser 210 uses the template script to implement logic for dynamic probes that are inserted when constructor and destructor methods are called for data objects. The software watchpoint dispenser 210 may insert dynamic probes for all data objects created during the execution of an application or for particular data objects, e.g., identified by a user through use of the software watchpoint dispenser 210.

A dynamic probe may be code used to identify particular situations in the execution of an application, such as a call to a particular method, and that performs a specific action when the particular situation or situations are identified. A software watchpoint may be a virtual address that, when used, causes a page fault to occur so that the dynamic data tracker 208 may determine that a corresponding data object is being accessed based on the page fault, as described in more detail below.

During a first execution of an application, when a constructor method is called to create a data object the software watchpoint dispenser 210 may use a dynamic probe, specific to that constructor method or generic to all constructor methods, to communicate with a datavisor 212 to create a software watchpoint for the data object. The software watchpoint dispenser 210 may create or use the dynamic probe at the exit of the constructor method. For example, the dynamic probe may be programmed to identify an exit from the particular constructor method and perform particular actions in response to the exit from the particular constructor method.

The software watchpoint dispenser 210 may use the probe to request, from the datavisor 212, a software watchpoint for the data object, e.g., the probe may be programmed to automatically request the software watchpoint in response to detection of an exit from the particular constructor method. As part of the request, the software watchpoint dispenser 210 may provide the address or size of the data object, or both. The datavisor 212 then creates a software watchpoint for the data object and provides the software watchpoint to the probe. The probe provides the address for the software watchpoint as the return address for the constructor of the data object, e.g., so that the application will use the address for the software watchpoint when accessing the data object.

Similarly, at the entry to the data object destructor method, the software watchpoint dispenser 210 may use a dynamic probe to inform the datavisor 212 to free the software watchpoint associated with the data object. The software watchpoint dispenser 210 may pass the software watchpoint as an argument to the dynamic probe and use the probe to send a request to the datavisor 212 to remove the mapping between the software watchpoint and the corresponding data object. The software watchpoint dispenser 210 receives the original address of the data object that is associated with the software watchpoint from the datavisor 212. The probe passes this address to the original code that used the watchpoint address to free the data object, e.g., using the data object destructor method. The software watchpoint dispenser 210 may use any appropriate method to communicate with the datavisor 212, e.g., with or without the use of probes.

For instance, the software watchpoint dispenser 210 may use a per-CPU data area to communicate with the datavisor 212. The per-CPU data area may be defined using the following data structure (1):

```
struct DatavisorCommBlock {                               (1)
    uint64 message;
    uint64 objectaddr;
    uint64 watchpoint;
    uint64 status;
    void *fence;
};
```

In some examples, fence may a virtual address initialized by the datavisor 212, and message may be an enum that is made up of one of the following values: WPALLOC, WPALLOCDONE, WPFREE, and WPFREEDONE.

When the software watchpoint dispenser 210 needs a software watchpoint, it may set message to WPALLOC and fill objectaddr with the address of the data object for which the software watchpoint is allocated. The software watchpoint dispenser 210 then writes a value to the address pointed to by fence to trigger a page fault. The fence address used by the software watchpoint dispenser 210 is a virtual address, e.g., allocated by the datavisor 212, that has no physical backing memory. In some examples, the same fence address is used for all communications between the software watchpoint dispenser 210 and the datavisor 212.

The page fault handler 212*a* detects the triggering of the page fault. When the page fault handler 212*a* determines that the value of message is WPALLOC, the page fault handler 212*a* allocates a software watchpoint address and, if the allocation is successful, puts the address in watchpoint and sets status to VMK_OK. If the allocation fails, the page fault handler 212*a* sets status to VMK_FAIL. The page fault handler 212*a* then places WPALLOCDONE in message to signify the allocation request was served and adjusts the return address of the page fault handler 212*a* to the instruction after the instruction that triggered the page fault and then returns from the page fault. When the software watchpoint dispenser 210 resumes execution, the software watchpoint address can be found in the watchpoint field.

Similar communication as described above is used when the software watchpoint dispenser 210 frees a software watchpoint except that message is set to WPFREE and watchpoint is filled with the software watchpoint to be free. The page fault handler 212*a* frees the software watchpoint by removing the software watchpoint address from the mapping with data objects. When the page fault handler 212*a* returns from the fault caused by the write access to fence, it places WPFFREEDONE in message, puts VMK_OK in status if the freeing of the software watchpoint is successful, or puts VMK_FAILURE in status if the freeing of the software watchpoint fails. The page fault handler 212*a* then places the address of the data object associated with the software watchpoint in objectaddr, e.g., for use by the destructor method of the data object.

In some implementations, when the datavisor 212 is loaded during the first execution of the application, an initialization module is invoked. The initialization module may replace a system page fault handler, e.g., for the application analysis system 206 or a portion of the application analysis system 206, with the page fault handler 212*a*. Similarly, a cleanup module, executed when the datavisor 212 is exited during the first execution of the application, may revert the work done by the initialization module, e.g., and restore the use of the original system page fault handler.

If a page fault occurs during the first execution of the application, the page fault handler 212*a* is invoked. The page fault handler 212*a* determines whether the address that caused the page fault is one of the addresses that the datavisor 212 allocated, e.g., as a software watchpoint or a fence address. If the address is not an address that the datavisor 212 allocated, the datavisor 212 passes the page fault to the system page fault handler for processing.

The page fault handler 212a determines whether the page fault is caused by the fence address or a software watchpoint address. If the page fault is caused by the fence address, the datavisor 212 checks the per-CPU data area, as described above, for a message from the software watchpoint dispenser 210.

If the address is a software watchpoint address, the page fault handler 212a checks whether it has seen the current stack trace before during the first execution of the application. For example, if the current stack trace is the same as another stack trace in an access record in a data access log 218, the page fault handler 212a determines that it has seen the current stack trace previously. The application analysis system 206 may determine that the execution of the first application is in a loop when the page fault handler 212 determines it has seen the current stack trace before during the first execution of the application and that no new access records should be stored in the data access log 218.

If the page fault handler 212a has already seen the stack trace, e.g., and the stack trace indicates an already known access point for the data object, the datavisor 212 executes the instruction that triggered the page fault with the software watchpoint address found in the instruction operands changed to the address of the data object that maps to the software watchpoint, e.g., to allow the correct read or store operation for the data object. For instance, the datavisor 212 steps through each of the instruction operands in the method that included the software watchpoint address including the particular instruction operand that triggered the page fault. After the execution of the instruction that triggered the page fault, the page fault handler 212a returns control of the execution of the application to the next instruction. In some examples, after execution of the instruction that triggered the page fault with the address of the data object, the data visor 212 replaces the address of the data object in the instruction operand that triggered the page fault with the software watchpoint address before control of the execution of the application passes to another operand in the application, e.g., the next instruction.

If page fault handler 212a has not already seen the stack trace, e.g., that the stack trace identifies a new access point for a data object, it determines a numeric identifier for the stack trace and creates a mapping between the numeric identifier and the stack trace. The page fault handler 212a may examine the instruction that caused the page fault to determine if the instruction was performing a read or write access to the software watchpoint and create a new access record, e.g., in a data access log 218, with the stack trace identifier, the address of the faulting instruction, the access type, or a combination of two or more of these. In some examples, the page fault handler 212a may store the data from the data object, the address of the data object, whether the access is a read or a write access, a timestamp when the access occurred, the stack trace identifier, and the address of the instruction that caused the access of the data object in the new access record. For instance, the page fault handler 212a may create a stack trace record and a BacktraceIDMap record, both of which are described in more detail below and can be stored in the same log or two different logs, for the data object access point.

After the first execution of the application and creation of the data access log 218, a data tracker fabricator 214, in the dynamic data tracker 208, may use the data access log 218 to produce a script that defines a set of dynamic probes to monitor the data objects of interest during a second execution of the application. For instance, the data tracker fabricator 214 may use the data access log 218, e.g., the access records in the data access log 218, a mapping of numeric identifiers to stack traces, or both, to produce a script that defines a list of dynamic probes that each represent an access point recorded in an access record of the data access log 218. Each of the dynamic probes may identify the data object being accessed, the name of the function that accessed the data object, the offset into the function of the instruction that access the data object, the stack trace identifier, the type and the size of access, or a combination of any two or more of these.

In some implementations, one or more of the probes created by the data tracker fabricator 214 may include additional logic. For instance, the application analysis system 206 may create a script for the probes and present the script to a user. The application analysis system 206 may receive input, in the script, from a user defining logic that should be performed during a second execution of the application when the probe is accessed. For instance, the logic may indicate that the value of the data object should be presented to a user or may include other types of debugging logic, performance analysis logic, or a combination of the two.

The script, e.g., two examples of which are described with reference to FIG. 5, binds each probe to an access point of a data object used during the first execution of the application. For instance, the name of the function that accessed the data object and the offset into that function are used during the second execution of the application to determine when the script that defines the probe should be executed, e.g., when the logic in the script that defines the probe should be executed. During the second execution of the application, when the application analysis system 206 executes the portion of the application that corresponds to a specific one of the access points, the application analysis system 206 will use the name of the function and the offset to determine that the script for the corresponding probe should be executed and execute that script. After execution of the script that defines the probe, the application analysis system 206 resumes the second execution of the application, e.g., on the previous code path.

The application analysis system 206 may use the probes to gather a history, e.g., in the data access log 218 or another log, of how data objects are accessed during the second execution of the application. When the application analysis system 206 executes the script associated with the probes during the second execution of the application, the application analysis system 206 stores an access history about some or all of the data objects in the order the data objects were accessed by the application, e.g., in the data access log 218. The gathered history may be based on the programming of the probes as to what information to store in the data access log 218 and for which data objects information should be stored. In some examples, each of the probes may include code that indicates that the context of the execution of the thread should be stored for later use during analysis of the application.

After the second execution of the application, a data access visualizer 216 may present the history stored in the data access log 218 to allow a user to identify a bug in the code or other performance issues with the code. The data access visualizer 216 may present one identifier for each record in the data access log 218 such that each record represents a single data access point during the execution of the application. For instance, when presenting the history data to a user for a particular data object, such as the stack trace of the code path and the content of the data object at the time of the access, the application analysis system 206 or the data access visualizer 216 may receive edits to one or more of the probes, e.g., from the user, a request to view information about data that corresponds to a previous record or the next record, or a combination of these, and the data access visualizer 216 provides the user with the requested information without requiring execution of the application again. For example, the application analysis system 206 may then receive input from a user indicating a change to the logic of a probe that generated at least part of a particular record in the data access log 218. The application analysis system 206 may receive input from the user indicating that the user would like to view data for a previous record or another specific record, e.g., the previous access point, a record ten steps back in the execution of the application, or a record eleven steps forward in the execution of the application.

During the presentation of the history data, the data access visualizer 216 may initially filter out most of the records stored in the logs and not present data stored in those records. The data access visualizer 216 may then receive a request from a user to present data for a particular data object or data objects and provide the requested data to the user without executing the application again, e.g., using the data access log 218 created during the first execution of the application and updated during the second execution of the application.

In some implementations, the probes may include debugging logic. The debugging logic may help a user trouble shoot a bug in an application or trace access of the data objects, to name a few examples. The data access visualizer 216 may receive updates to the debugging logic during presentation of the history data of the execution of the application and update the presentation of the history data in response. In some examples, the application analysis system 206 may perform another second execution of the application with the update probe logic to update the data access log 218. The data access visualizer 216 may update the presentation of the history data using new or updated records from the data access log 218. The data access visualizer 216 may present information about a single record or data access point at a time, e.g., and receive input from a user requesting a presentation of the next sequential data access point or record or a different data access point from the execution of the application. The data access visualizer 216 may present an animation of the history data generated from the execution of the application.

In some implementations, the application analysis system 206 may generate all of the data for the presentation of the history of the application in a single execution of the application. For instance, instead of performing a first execution and a second execution, the application analysis system 206 may perform only one execution of the application. The single execution may create different logs for different test scenarios, defined by a user.

In some examples, the data access visualizer 216 may use stack trace records and object change records, both of which are described in more detail below, to generate a call graph that shows the location of each access point during the execution of the application. The call graph or the presentation of history data may be used to improve performance of the application. For instance, a user may view the call graph or the presentation of the history data to determine that the application's access of a computer processing unit (CPU) 220, a CPU cache 222, or a memory 224 can be improved.

In some implementations, the application analysis system 206 may perform a single first execution of the application to generate records in the data access log 218, e.g., stack trace records and BacktraceIDMap records, described in more detail below. The application analysis system 206 may then preform a single second execution of the application, e.g., using the BacktraceIDMap records, to update the records in the data access log 218 with additional data or to create object change records, described in more detail below. The data access visualizer 216 uses a mapping between the stack trace records and the object change records to generate the presentation of history data. The application analysis system 206 may receive updates to the logic of one or more of the probes used during the second execution of the application and perform another second execution of the application to create updated object change records. The data access visualizer 216 may then use the same mapping between the stack trace records and the object change records to generate another presentation of history data for the execution of the application.

In some examples, the application analysis system 206 may receive a first execution script defined by a user indicating how the application should execute during the first execution. For instance, the execution script may indicate one or more test scenarios for the application each of which may provide the user with information about a bug in the application or performance information about the application. The application analysis system 206 may receive a second execution script defined by the user for the second execution of the application that defines only a single test scenario, e.g., to allow the user to determine whether that test scenario is the cause of the bug. The application analysis system 206 may then perform one second execution of the application for each of the scenarios tested during the first execution of the application, e.g., and create a separate log for each of the second executions. This allows the application analysis system 206 to present different history data to a user for each of the different test scenarios, e.g., so that the user may optimize the performance of each scenario, determine during which scenarios a bug occurs, or both.

For a single scenario, the first execution script and the second execution script instruct the application to perform the same execution path. For instance, when the application executes according to the first execution script and separately for the second execution script, the application has the same execution path, e.g., performs the same operations, so that the same access points are encountered during the execution. The application analysis system 206 may perform a single first execution to identify all of the potential data access points, irrespective of which execution path is taken, and multiple second executions of the application so that the history data for each of the different scenarios is stored separately and can be presented to a user separately, e.g., for debugging or optimization purposes.

The data access log 218 includes one or more records, each of which includes different data, for each access of a data object during execution of the application. For instance, the data access log 218 may include one stack trace record, one BacktraceIDMap record, and one object change record for a specific access point. These records may be stored in a single log, e.g., the data access log 218, or in separate logs, e.g., one log for all of the stack trace records, one log for all of the BacktraceIDMap records, and one log for all of the object change records.

In some implementations, the software watchpoint dispenser 210 may be customized for each application, use case, e.g., test, or both, since the location during application execution when constructor and destructor methods are called, e.g., the particular time during execution or the instructions that cause the methods to be called, is different for different data objects. For instance, the particular location in which a dynamic probe executes during execution of an application may be specific to the application, data object, or both, e.g., when a different sequence of methods leads to the execution of a particular constructor or destructor method. In some examples, for data objects that have well defined constructors and destructors, the changes in probes, the software watchpoint dispenser 210, or both, may be minimal, e.g., when an administrator is customizing the software watchpoint dispenser 210 for a particular application.

In some implementations, the software watchpoint addresses, the fence address, or a combination of both are virtual addresses that are allocated from a virtual memory region that is not in use, e.g., by the application analysis system 206 or another application executing on the same physical hardware as the application analysis system 206. The fence address may be fixed, e.g., the software watchpoint dispenser 210 may use the same fence address each time to communicate with the datavisor 212. The software watchpoint addresses are allocated on demand, e.g., when a data object is created.

In some implementations, the datavisor 212 may be implemented in a kernel of a system. For instance, the datavisor 212 may be implemented in a virtual machine kernel.

The user devices 202a-c may include personal computers, mobile communication devices, and other devices that can send and receive data over a network 226. The network 226, such as a local area network (LAN), wide area network (WAN), the Internet, or a combination thereof, connects the user devices 202a-c, the code repository 204, and the application analysis system 206.

In some implementations, the code repository 204 and the application analysis system 206 are part of the same system, e.g., both execute on the same computer or group of computers. In some implementations, the application analysis system 206 executes on multiple different computers in one or more physical locations. For instance, the software watchpoint dispenser 210 and the datavisor 212 may execute on a first computer and the data tracker fabricator 214 may execute on a second computer.

Figure 3:
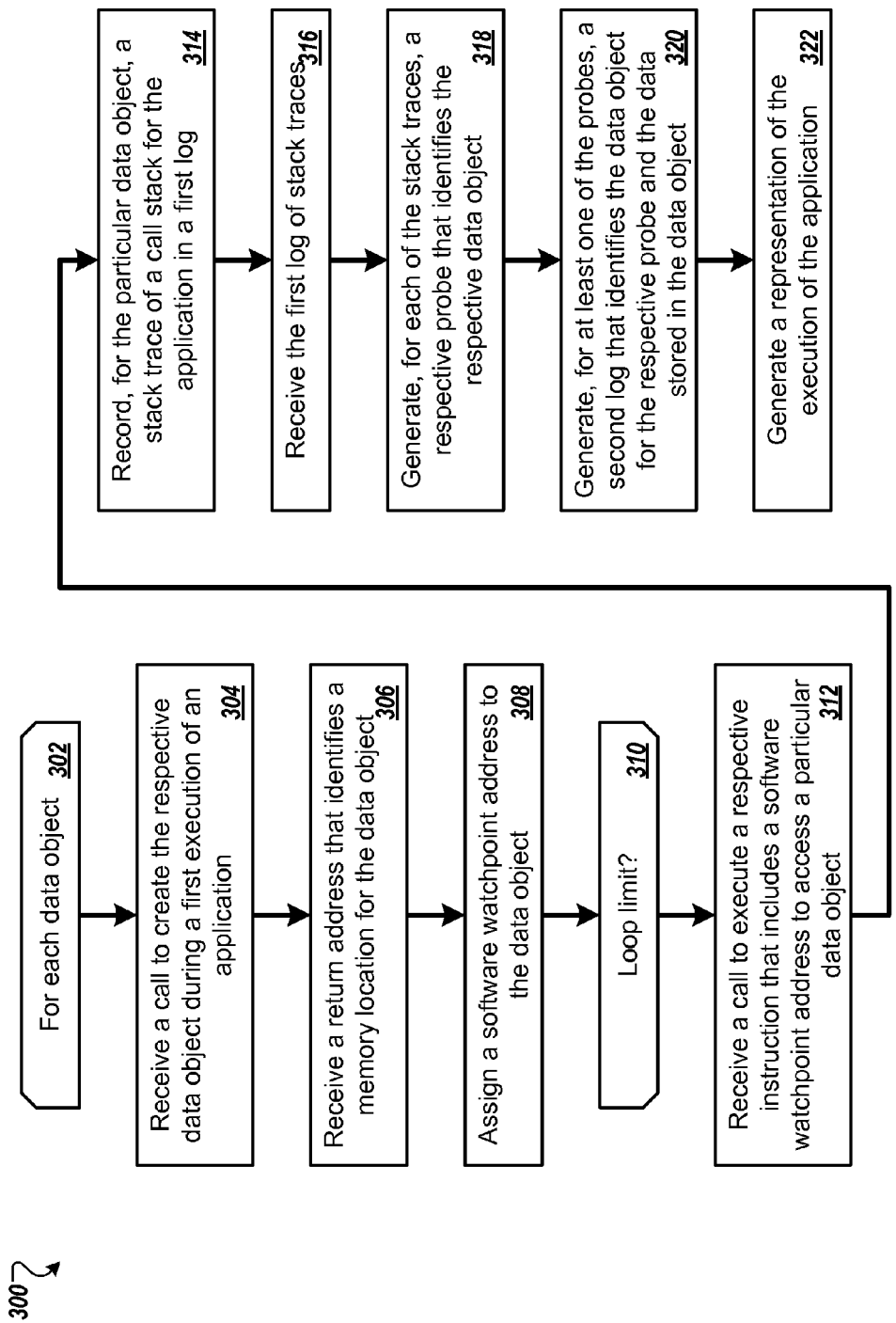
FIG. 3 is a flow diagram of a process for analyzing the execution of an application.

FIG. 3 is a flow diagram of a process 300 for analyzing the execution of an application. For example, the process 300 can be performed by the application analysis system 206 or the dynamic data tracker 208 from the environment 200 of FIG. 2.

For each data object 302, the application analysis system, at 304, receives a call to create the respective data object during a first execution of an application. The call to create the respective data object may be a call to a corresponding constructor method during the execution of the application. For instance, a software watchpoint dispenser uses a dynamic probe to receive the call to execute the constructor method.

At 306, the application analysis system receives a return address that identifies a memory location for the data object. For example, the dynamic probe receives the return address.

At 308, the application analysis system assigns a software watchpoint address to the data object. For instance, the probe provides the return address to the datavisor. The datavisor assigns the software watchpoint address to the data object and maps the software watchpoint address to the return address and stores the mapping in memory. The probe, or the software watchpoint dispenser receives the software watchpoint address from the datavisor.

At 310, the application analysis system determines whether a constructor for another data object, of the same type or of a different type, has been called. For instance, the process 300 may repeat steps 304 through 308 multiple times for different data objects. Steps 304 through 308 may be performed at multiple different times, e.g., non-sequentially, during the first execution of the application. For example, the process 300 may perform steps 304 through 308 for a first data object, perform step 312 for that first data object, and then perform steps 304 through 308 for a second data object.

At 312, the application analysis system receives a call to execute a respective instruction that includes a software watchpoint address to access a particular data object. For instance, the datavisor or the page fault handler may determine that a page fault occurred when the application tried to access a memory location identified by the software watchpoint address and the particular data object that corresponds to the software watchpoint address, e.g., using the mapping created in step 308.

At 314, the application analysis system records, for the particular data object, a stack trace of a call stack for the application in a first log. For example, the datavisor stores the stack trace and information about the instruction that caused the page fault, e.g., the name of the corresponding method, in the first log.

The application analysis system may perform steps 312 and 314 for multiple different data objects, for the same data object multiple times, or both.

At 316, the application analysis system receives the first log of stack traces. For instance, after the first execution of the application during steps 302 through 314, the datavisor may store the first log in memory. The application analysis system or the data tracker fabricator may then retrieve the first log from memory at a later time.

At 318, the application analysis system generates, for each of the stack traces, a respective probe that identifies the respective data object. At 320, the application analysis system generates, for at least one of the probes, a second log that identifies the data object for the respective probe and the data stored in the data object. The application analysis system may generate the second log during a second execution of the application. The application analysis system may use each of the probes to create one or more records in the second log.

At 322, the application analysis system generates a representation of the execution of the application. For example, each of the records are used to present information to a user about the corresponding data objects or to update the script for the corresponding probe, or both.

In some implementations, the process 300 can include additional steps, fewer steps, or some of the steps can be divided into multiple steps. For example, the process may include only steps 302 through 310, steps 302 through 312, or steps 316 through 322.

Figure 4:
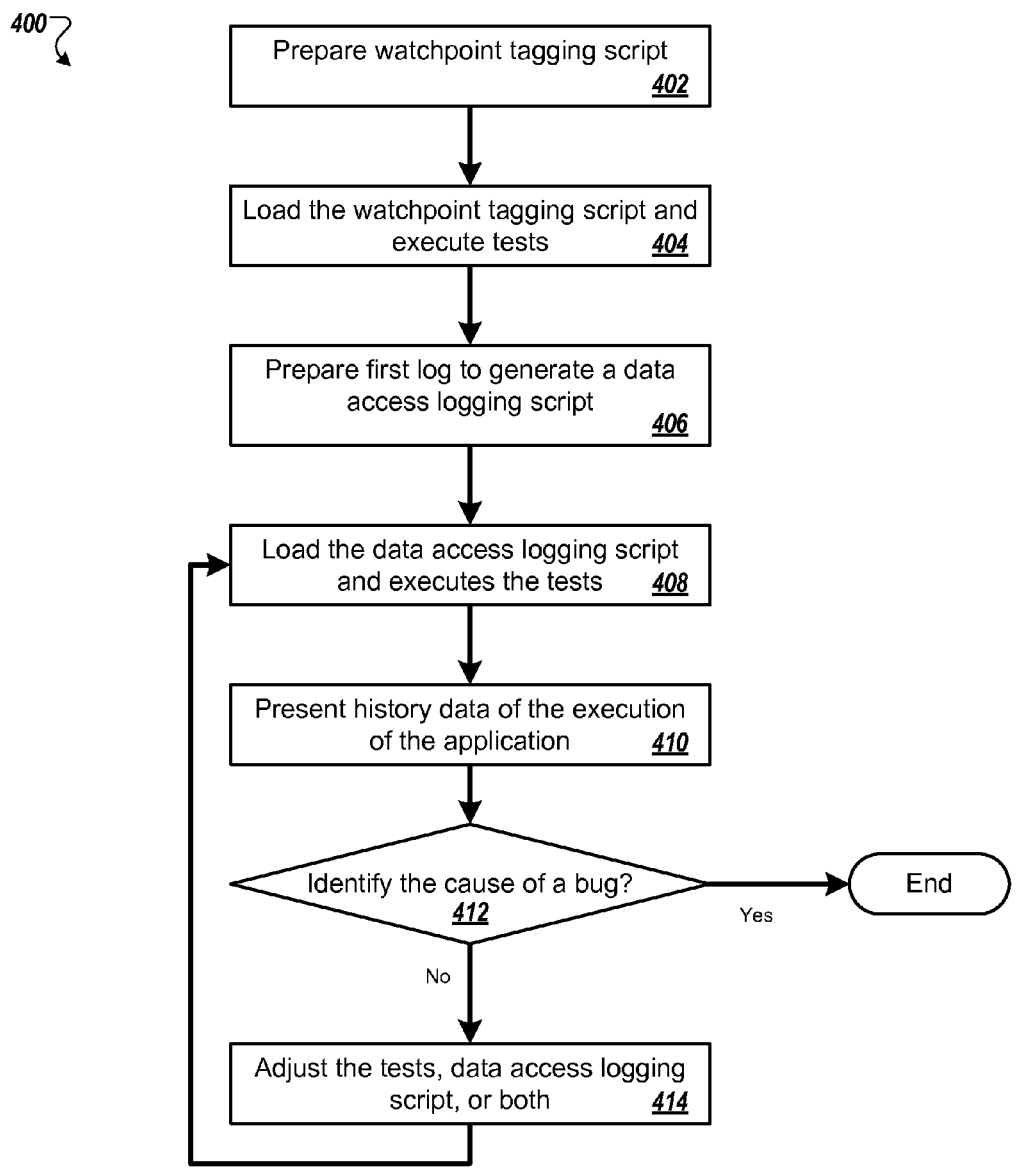
FIG. 4 is a flow diagram of a process for identifying a software bug.

FIG. 4 is a flow diagram of a process 400 for identifying a software bug. For example, the process 400 can be performed by the application analysis system 206 or the dynamic data tracker 208 from the environment 200 of FIG. 2.

At 402, the application analysis system prepares a watchpoint tagging script. For example, the application analysis system may receive input identifying all of the types of access points or data objects for which data will be stored in a log during execution of an application, e.g., a first execution of the application. The access points may be code sites where data is being read or modified during the execution. The data may be primitive type data and may range in size from one byte to a multipage data object.

At 404, the application analysis system loads the watchpoint tagging script and executes tests, e.g., during the first execution of the application. For instance, the application analysis system creates probes using the watchpoint tagging script and executes the tests of the application to create a first log. The application analysis system may use a different watchpoint tagging script for each test execution of the application, e.g., for each first execution of the application, or may use the same watchpoint tagging script. In some examples, the probes only monitor data objects that are referenced using pointers. In some implementations, the probes monitor any type of data object whether or not the data objects are referenced by pointers.

At 406, the application analysis system prepares a first log to generate a data access logging script. For example, the application analysis system performs steps 302 through 318 from the process 300 to create the first log. The application analysis system may use the probes to identify calls to constructor and destructor methods during the first execution of the application and create or remove, respectively, software watchpoints for the data objects. The application analysis system may use the data access logging script to generate the dynamic probes for a second execution of the application.

For instance, the application analysis system may execute the tests of the application during the first and second execution of the application to reproduce issues that may have occurred during previous executions of the application, e.g., for which the application analysis system may or may not have generated a data access logging script. As the test runs, the data objects of identified by the application analysis system may be created and tagged with a software watchpoint, e.g., during the first execution.

In some examples, when any part of a data object which is being tracked is accessed, the access produces a trap, e.g., caused by the creation of a page fault when the application accesses the software watchpoint. The datavisor's page fault handler may store the location of the access point, the code path, and the type of access in an access record, e.g., in the first log. Each access record in the first log may represent a unique access point.

At 408, the application analysis system loads the data access logging script and executes the tests during the second execution of the application. For instance, the data tracker fabricator generates a dynamic probe for each of the access records in the first log. The application analysis system may use the generated dynamic probes during the second execution of the application to present information to a user about the access records using the dynamic probes, to create a second log, or both.

The application analysis system presents history data of the execution of the application, at 410, and may receive information from a user indicating an edit to the data access logging script. For instance, the information may include logic for the application analysis system to perform that provides debugging information to the user to help the user trouble shoot the issue with the application. The application analysis system may allow the user to edit the data access logging script and perform another second execution of the application and update the history data in response, or reflected updates to the data access logging script in the next second execution of the application, e.g., when the current presentation of the history data is not updated.

At 412, the application analysis system determines whether the cause of a bug is identified. For instance, the application analysis system provides debugging information to the user using the probes generated using the first log, e.g., and defined in the data accessing logging script, and helps the user determine the cause of the bug. The application analysis system may receive input from the user upon identification of the bug, e.g., edits to the code of the application or selection of an end execution of the application control.

The application analysis system may compare data access logging scripts generated during different tests, e.g., different second executions of the application, to identify potential causes of the issues. For instance, the application analysis system may determine that a particular data object included different data values during executions of the application in which the error occurred compared to the executions of the application in which the error did not occur.

When the application analysis system does not identify the cause of the bug, at 414, the application analysis system adjusts the tests, the data access logging scripts, or both. For instance, the application analysis system may receive edits to the data access logging script, or an edit to one of the application tests or a new application test and a request to execute the application again, e.g., another second execution of the application, and generate a new second log for the edited or new test.

The process 400 or one or more of the steps of the process 400, e.g., steps 406 through 414, may be performed iteratively to help the user, the application analysis system, or both, narrow down the cause of the issue with the application.

FIG. 5 shows an example of a script 500 that includes code for two dynamic probes. The data tracker fabricator 214 may use the script when generating dynamic probes for the second execution of an application. For instance, read dynamic probe code 502 "funcFoo:0xabcdef00000" is for a read access point and write dynamic probe code 504 "funcBar:0xabcdeff00000" is for a write access point. The data tracker fabricator 214 retrieves the values indicated in bold, italic font from records in the data access log 218, e.g., "0xabcdef00000," "11," "READ," "8," "REG_RAX," and "0xf00d" for the read dynamic probe code 302.

The data tracker fabricator 214 may use the backTraceID value to determine the data in a stack trace record that corresponds to data in an object change record for the same data access point. The value may be determined using the sequence with which the execution of the application created access points, e.g., a value of eleven may indicate that the read dynamic probe code 502 is for the twelfth data access point when using base zero numbering.

In some examples, there may be multiple code paths that touch the access point. For instance, a value of zero for the backTraceID indicates that the data tracker fabricator 214 cannot predetermine on which code path the access point is reached when generating the dynamic probe for the access point, e.g., since the access point is a first access point in the execution of the application and multiple code paths may branch from that first access point. In this case, the dynamic probe represented by the corresponding code will be used for each of the code paths that branch from the first access point. For instance, during presentation of history data, the data generated from this dynamic probe may be presented for multiple different test scenarios. This may occur for other probes that have different backTraceIDs. In some implementations, when "accessType" is a particular enum value, e.g., WRITE_CONSTANT, then "newValue" will be assigned with a constant from the corresponding record in the data access log 218.

The data tracker fabricator 214 may use the objAddress and objOffset to identify the specific location in a particular function in which the data access point was created. The application analysis system 206 uses this data to determine when to execute the logic associated with the probe. For instance, when determining that the logic should be executed, the application analysis system 206 may execute ddt_getValue(objAddress, objOffset) to determine the value for the data object and store that value in a new object change record using the function call ddt_log_access. Similarly, for a write access point, the application analysis system 206 may retrieve the value to be written to a data object with the function getgpr and the old value for the data object using the function ddt_getValue. The application analysis system 206 may then store both of these values and other data for the data access point to a log by creating an object change record with the function ddt_log_access. For both of the probes, the application analysis system 206 would also execute any logic entered into the code identified in the location of the "/* Add your tracing code here */" text.

FIG. 6 shows an example format of a stack trace record 600. For example, the data access log 218 may include multiple stack trace records 600 for each of the access points identified during the first execution of an application. The stack trace records 600 may be used to generate a presentation of history data for the application. For instance, the application analysis system 206 can generate a call graph using the stack trace records 600.

FIG. 7 shows an example format of a BacktraceIDMap record 700. The data access log 218 may include a BacktraceIDMap record 700 for each of the stack trace records 600. In some examples, the BacktraceIDMap record 700 is a variable size record with "ReturnAddress" repeated "TraceDepth" many times, e.g., where each of the ReturnAddresses may be unique. For example, a stack trace may be a sequence of return addresses of nested function calls. In this example, "TraceDepth" indicates how deep the calls are nested in the stack trace, e.g., that there are "TraceDepth" quantity ReturnAddresses in the BacktraceIDMap record 700. In some examples, "ReturnAddress" can be translated into a corresponding symbol name using the combination of the address information stored in Executable and Linkable Format (ELF) headers of the kernel modules and the actual loading address of the kernel. The data tracker fabricator 214 may use the BacktraceIDMap records 700 to generate script for the probes, e.g., the read dynamic probe code 502 and the write dynamic probe code 504.

FIG. 8 shows an example format of an object change record 800. The application analysis system 206 may present information about the execution of an application using a log of object change records 800, e.g., created during the second execution of the application. The application analysis system 206 may include one log of object change records for each second execution of the application, e.g., for each test scenario. For instance, the application analysis system 206, or a module in the application analysis system, may iterate through the log of object change records 800 and produce a graphical display of the code paths, or the call graphs, and the changes to the values of the data objects represented by each record.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, for each of a plurality of data objects created during a first execution of an application, a call to create the respective data object during the first execution of the application;
   receiving, for each of the plurality of data objects in response to receiving the call to create the respective data object, a respective return address that identifies a corresponding memory location for the data object;
   assigning, for each of the plurality of data objects, a corresponding watchpoint address, which causes a page fault when accessed, to the corresponding data object;
   providing, in response to the call to create the respective data object, the corresponding watchpoint address;

receiving, for at least some of the plurality of data objects, a call to execute a respective instruction that includes the corresponding watchpoint address to access the corresponding data object;

recording, in response to receiving the call to execute the instruction that includes the corresponding watchpoint address to access the corresponding data object, a stack trace of a call stack for the application in a first log of stack traces;

generating, for each of the stack traces in the first log, a script for a respective probe that identifies the data object accessed by the call corresponding to the stack trace, a respective instruction called to access the data object, and whether the access is a read or a write access for the data object;

generating, for at least one of the probes, a second log that identifies the data object for the respective probe and the data stored in the data object; and generating a representation of the execution of the application using the second log.

2. The method of claim 1, wherein the script for the respective probe that identifies the data object accessed by the call corresponding to the stack trace comprises a script for the respective probe that identifies the data object accessed by the call corresponding to the stack trace with an address for the data object.

3. The method of claim 1, wherein generating, for the at least one of the probes, the second log that identifies the data object for the respective probe and the data stored in the data object comprises:

for each probe in a subset of the probes generated from a stack trace in the first log that identifies a read access to a respective data object, storing a current data value from the respective data object in the second log when the respective data object is accessed; and for each probe in another subset of the probes generated from a stack trace in the first log that identifies a write access to a respective data object, storing a new data value and a current data value from the respective data object in the second log when the respective data object is accessed.

4. The method of claim 1, wherein each of the probes identify the respective stack trace.

5. The method of claim 1, comprising:

receiving, for at least one of the probes, input from a user defining logic for the corresponding probe, wherein the logic provides troubleshooting analysis to a user;

determining, during a second execution of the application, that the logic for a particular probe should be executed; and presenting, using the logic for the particular probe, information about a respective particular data object identified in the script for the particular probe in response to determining that the logic for the particular probe should be executed.

6. The method of claim 1, wherein generating the representation of the execution of the application using the second log comprises:

analyzing a performance of the execution of the application using the second log; and providing a visual presentation of the performance on a user interface.

7. The method of claim 6, wherein analyzing the performance of the execution of the application using the second log comprises analyzing a central processing unit's access to a cache during the execution of the application.

8. The method of claim 1, wherein generating the representation of the execution of the application using the second log comprises generating instructions for a presentation of a visual representation of the execution of the application, the method comprising:

providing the instructions for the presentation of the visual representation of the execution of the application to a display.

9. The method of claim 8, wherein providing the instructions for the presentation of the visual representation of the execution of the application to the display comprises providing, for at least one of the probes, instructions for a presentation of at least some of the data stored in the corresponding data object to the display.

10. The method of claim 9, wherein providing the instructions for the presentation of at least some of the data stored in the corresponding data object to the display comprises providing instructions for a presentation of data identifying how the data stored in the corresponding data object is changed or accessed during the execution of the application.

11. The method of claim 8, wherein providing the instructions for the presentation of the visual representation of the execution of the application to the display comprises providing instructions for a presentation of a visual representation of the execution of the application using data identified in at least one of the probes.

12. The method of claim 11, wherein providing the instructions for the presentation of the visual representation of the execution of the application comprises:

presenting a history of the execution of the application using the second log; and highlighting a representation of a particular probe from the probes when data from the corresponding data object is accessed during the execution of the application.

13. The method of claim 1, wherein assigning the corresponding watchpoint address to corresponding the data object that will cause a page fault when accessed comprises mapping, for each of the plurality of data objects, the corresponding watchpoint address to the corresponding return address in a table.

14. The method of claim 1, comprising:

replacing, for the at least some of the plurality of data objects in response to receiving the call to execute the instruction that includes the corresponding watchpoint address to access the corresponding data object, the corresponding watchpoint address in the respective instruction with the corresponding return address; and executing, for the at least some of the plurality of data objects in response to replacing the corresponding watchpoint address in the respective instruction with the corresponding return address, the respective instruction with the corresponding return address.

15. The method of claim 1, wherein receiving the call to execute the respective instruction that includes the corresponding watchpoint address to access the corresponding data object comprises:

determining, for the at least some of the plurality of data objects, that accessing the watchpoint address will cause a page fault; and receiving, for the at least some of the plurality of data objects, the call to execute the respective instruction that includes the corresponding watchpoint address to access the corresponding data object in response to determining that accessing the watchpoint address will cause a page fault.

16. The method of claim 1, wherein assigning the corresponding watchpoint address, which will cause a page fault when accessed, to the corresponding data object comprises assigning, for each of the plurality of data objects in response to receiving the return address that identifies the corresponding memory location for the corresponding data object, a unique corresponding watchpoint address, which will cause a page fault when accessed, to the corresponding data object.

17. The method of claim 1, comprising:
receiving, for at least some of the plurality of the data objects, a call to execute a corresponding destructor method during the execution of the application;
removing, for the at least some of the plurality of the data objects, the assignment of the corresponding watchpoint address to the corresponding data object; and
removing, for the at least some of the plurality of the data objects, a reference to the corresponding data object from memory.

18. The method of claim 1, wherein recording, in response to receiving the call to execute the instruction that includes the corresponding watchpoint address to access the corresponding data object, the stack trace of the call stack for the application in the first log of stack traces comprises recording a respective stack trace in the first log of stack traces for each call to access any of the plurality of data objects created during the first execution of an application.

19. The method of claim 1, wherein recording, in response to receiving the call to execute the instruction that includes the corresponding watchpoint address to access the corresponding data object, the stack trace of the call stack for the application in the first log of stack traces comprises recording a respective stack trace in the first log of stack traces for each call to access any data object created during the first execution of an application.

20. A system comprising:
one or more computers and one or more storage devices on which are stored instructions that are operable, when executed by the one or more computers, to cause the one or more computers to perform operations comprising:
receiving, for each of a plurality of data objects created during a first execution of an application, a call to create the respective data object during the first execution of the application;
receiving, for each of the plurality of data objects in response to receiving the call to create the respective data object, a respective return address that identifies a corresponding memory location for the data object;
assigning, for each of the plurality of data objects, a corresponding watchpoint address, which causes a page fault when accessed, to the corresponding data object;
providing, in response to the call to create the respective data object, the corresponding watchpoint address;
receiving, for at least some of the plurality of data objects, a call to execute a respective instruction that includes the corresponding watchpoint address to access the corresponding data object;
recording, in response to receiving the call to execute the instruction that includes the corresponding watchpoint address to access the corresponding data object, a stack trace of a call stack for the application in a first log of stack traces;
generating, for each of the stack traces in the first log, a script for a respective probe that identifies the data object accessed by the call corresponding to the stack trace, a respective instruction called to access the data object, and whether the access is a read or a write access for the data object;
generating, for at least one of the probes, a second log that identifies the data object for the respective probe and the data stored in the data object; and
generating a representation of the execution of the application using the second log.

21. A non-transitory machine readable storage medium embodying computer software, the computer software causing a computer to perform a method, the method comprising:
receiving, for each of a plurality of data objects created during a first execution of an application, a call to create the respective data object during the first execution of the application;
receiving, for each of the plurality of data objects in response to receiving the call to create the respective data object, a respective return address that identifies a corresponding memory location for the data object;
assigning, for each of the plurality of data objects, a corresponding watchpoint address, which causes a page fault when accessed, to the corresponding data object;
providing, in response to the call to create the respective data object, the corresponding watchpoint address;
receiving, for at least some of the plurality of data objects, a call to execute a respective instruction that includes the corresponding watchpoint address to access the corresponding data object;
recording, in response to receiving the call to execute the instruction that includes the corresponding watchpoint address to access the corresponding data object, a stack trace of a call stack for the application in a first log;
generating, for each of the stack traces in the first log, a script for a respective probe that identifies the data object accessed by the call corresponding to the stack trace, a respective instruction called to access the data object, and whether the access is a read or a write access for the data object;
generating, for at least one of the probes, a second log that identifies the data object for the respective probe and the data stored in the data object; and
generating a representation of the execution of the application using the second.

* * * * *